March 15, 1960 B. W. KOEPPEL 2,929,060

RADIO LOCATION SYSTEM

Filed March 20, 1957 4 Sheets-Sheet 1

March 15, 1960 | B. W. KOEPPEL | 2,929,060

RADIO LOCATION SYSTEM

Filed March 20, 1957 | 4 Sheets-Sheet 2

INVENTOR

BEVERLY W. KOEPPEL

BY

Mason, Kolehmainen, Rathburn and Wyss

ATTORNEYS

March 15, 1960 B. W. KOEPPEL 2,929,060

RADIO LOCATION SYSTEM

Filed March 20, 1957 4 Sheets-Sheet 3

INVENTOR

BEVERLY W. KOEPPEL

BY

Mason, Kolehmainen, Rathburn and Wyss

ATTORNEYS

INVENTOR

BEVERLY W. KOEPPEL

BY

Mason, Kolehmainen, Rathburn and Wyss.

ATTORNEYS

United States Patent Office 2,929,060

Patented Mar. 15, 1960

2,929,060

RADIO LOCATION SYSTEM

Beverly W. Koeppel, Tulsa, Okla., assignor to Seismograph Service Corporation, Tulsa, Okla., a corporation of Delaware Application March 20, 1957, Serial No. 647,306

18 Claims. (Cl. 343—105)

The present invention relates generally to radio position finding systems and more particularly to improvements in radio position finding systems of the hyperbolic, continuous wave type employing phase comparison in pairs of position indicating signals radiated from a plurality of fixed and spaced apart transmitting points in order to provide indications from which the position of a mobile receiving point relative to the known positions of the transmitting points may be determined.

In systems of the particular type referred to, the continuous waves radiated from each pair of transmitting points as received at the mobile receiving point bear a phase relationship which changes as a function of the changing position of the receiving point relative to the fixed transmitting points. More specifically, the waves radiated by each pair of transmitting units of the system are characterized by spaced iso-phase lines which are hyperbolic in contour about the transmitting points as foci. On a line connecting the pair of transmitters, conventionally called a base line, these iso-phase lines are spaced apart a distance which is a function of the wave length of the radiated waves and at points on either side of the base line these iso-phase lines have diverging spacings. With this system arrangement, the position of a receiving point relative to a pair of hyperbolic iso-phase lines may be determined by measuring the phase relationship between continuous waves received from the pair of transmitters.

Since the point of location of the receiving point along the zone separating the two iso-phase lines is not indicated by such a phase measurement, it is desirable to employ at least three spaced transmitters, different pairs of which function to provide a grid like pattern of intersecting hyperbolic iso-phase lines in order to obtain an absolute determination or fix of the position of the receiving point.

Systems of the character described are exceedingly accurate insofar as the position indications produced at the receiving point are concerned. To obtain the desired indication accuracy, however, it is necessary to maintain phase synchronization between the continuous waves radiated by the spaced transmitters or, alternatively, so to arrange the system that phase shifts between the radiated waves are compensated during the phase comparing operation.

To obviate the problem of phase synchronization of the waves radiated from the plurality of transmitters, systems of the continuous wave hyperbolic type have been proposed, as, for example, in Honore Patent No. 2,148,267, issued February 21, 1939, in which the phase shift problem is obviated by heterodyning the position indicating signals radiated from each pair of transmitters at a fixed link transmitting point, and modulating the difference frequency component of the heterodyned signals as a reference signal upon the carrier wave output of the link transmitter for radiation to the receiving point where the difference frequency component is detected and phase compared with a difference frequency signal derived by directly heterodyning the transmitted position indicating signals. In this manner, phase shifts between the continuous waves radiated from the two transmitters are completely compensated so that the measured phase angle is truly representative of the location of the receiving point between an adjacent pair of the above-described iso-phase lines.

While the described arrangement for obviating the phase synchronization problem is entirely satisfactory it entails the use of two carrier channels in addition to the three or four channels required by the three or four continuously operating survey transmitters. It is desirable that channel frequencies employed be located adjacent the broadcast band or at least below the ultra-high frequency band in order to obviate the problem of line-of-sight transmission which, of course, necessitates the location of a number of channel frequencies in the most crowded portion of the frequency spectrum at least insofar as operations in the United States are concerned. Since frequency allocations in this band must be maintained at a minimum it is highly desirable to provide a system which reduces the number of channels required.

One arrangement which has been proposed to satisfy the problem just discussed is shown in Hawkins Patent No. 2,513,316 issued July 4, 1950, and assigned to the same assignee as the present invention. In this arrangement the position indicating signals radiated from three survey transmitters are heterodyned in pairs at a single link transmitting unit in order to develop the beat frequency components therebetween. Reference signals derived from at least two of these beat frequency components are then simultaneously modulated upon a carrier wave continuously radiated from the link transmitting unit for radiation to the mobile receiving point where the reference signals are detected and compared with beat frequencies derived by directly heterodyning the signals from the survey transmitters. Another arrangement which has been proposed to reduce both the amount of equipment employed and the number of frequency channels used is disclosed in Hawkins and Finn Patent No. 2,513,317, issued July 4, 1950, and assigned to the same assignee as the present invention. In the system disclosed in the latter patent, a first of the survey transmitters is rendered alternately operative to radiate first one and then another position indicating signal while the second and third survey transmitters are each effective continuously to radiate carrier waves which are alternately modulated with reference signals. Thus, during the interval when the first survey transmitter is radiating its first signal, the second survey transmitter heterodynes this first signal with the signal continuously radiated from the third transmitter in order to develop a reference signal which is modulated upon the carrier wave output of the second survey transmitter. Similarly, during the interval when first survey transmitter is effective to radiate its second signal the third survey transmitter heterodynes this second signal with the signal continuously radiated from the second survey transmitter in order to develop a reference signal which is modulated upon the carrier wave output of the third survey transmitter. Thus the second and third survey transmitters are alternately rendered effective to function as link or reference signal transmitters. At the mobile receiving unit these reference signals and position indicating signals are converted into position indications in the manner described in the above-identified Honore patent.

In all of the systems, described above, filtering devices are required both at the link transmitting units and at the mobile receiving unit in order to separate the desired reference or beat frequency signals from the undesired signal components. These filtering devices are phase sensitive to changes in the amplitudes of their input signals, and this is particularly true when high level or strong signals are supplied to the filters. In order to prevent the filters from introducing undesired phase shifts in response to amplitude changes of their input signals, it is desirable to hold the amplitude of the input signals substantially constant as, for example, by means of an automatic volume control circuit. However, in all of the systems referred to above, each automatic volume control circuit is excited by two or more input signals which are adapted to be supplied to the filter for separation. If these input signals are of different amplitude as is frequently the case, particularly in the circuits of the mobile receiving equipment when the mobile unit is located relatively close to one of the transmitting stations of the system and relatively remote from one or more of the other transmitting units, the automatic volume control circuit generally adjusts its gain to correspond to the mean or average amplitude of the input signals. As a result, insufficient attenuation is provided for the high amplitude signals while the weak signals are reduced much too severely and may, in fact, be lost. Therefore, the receiving apparatus heretofore employed and particularly the filtering and automatic volume control portion of that apparatus has been subject to objection in introducing errors of the type just discussed.

Moreover, in switching systems of the type disclosed in the Hawkins and Finn patent referred to above, the AVC circuit is excited by different signals during the different switching intervals. If the AVC circuit has a time constant which is relatively long in comparison with the switching rate, the gain of the AVC circuit is varied in accordance with the average value of the input signals available during the different intervals with the attendant disadvantages previously mentioned. If, on the other hand, a short time constant AVC circuit is employed so that the gain adjusts itself to the signals received during each interval large transients are introduced which seriously disturb the operation of the phase indicating equipment at the mobile receiving unit. Thus, it is essential that relatively long time constant AVC circuits be employed and, the use of a short time constant AVC does not afford a practical solution to the problem of obtaining a volume control which does not respond to undesired input signals.

The primary object of the present invention is therefore to provide a radio position finding system in which the aforementioned disadvantages of the prior art arrangements are avoided.

It is a further object of the present invention to provide an improved radio location system of the continuous wave type employing new and improved receiving apparatus for use at the link transmitting station or stations and/or at the mobile receiving equipment.

It is another object of the present invention to provide improved automatic volume control circuits for use in receiving apparatus employed in radio location systems of the character indicated above.

It is also an object of the present invention to provide improved receiving apparatus for use both at the link transmitting unit and at the mobile receiving equipment in a radio position finding system of the above indicated character, which receiving apparatus is provided with a filtered loop type AVC circuit having its gain automatically controlled in response to a single desired input signal in such manner that the gain is unaffected by other input signals.

The invention, both as to its organization and method of operation together with further objects and advantages thereof will best be understood by reference to the specification taken in conjunction with the accompanying drawings wherein.

Figure 1:
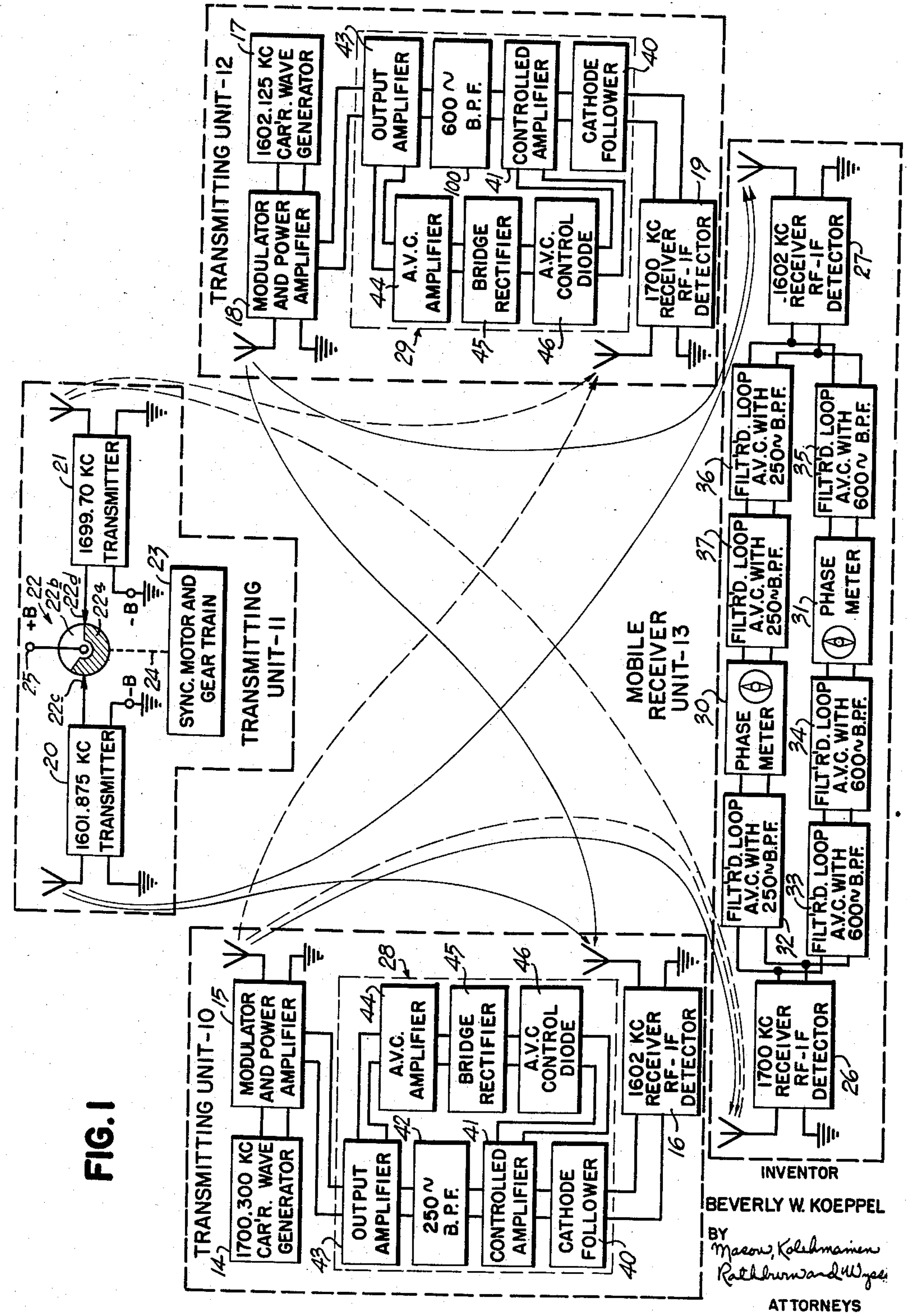
Fig. 1 is a diagrammatic representation of the transmitting and receiving equipment making up a three foci radio position finding system of the hyperbolic continuous wave type embodying the present invention.
Figure 3:
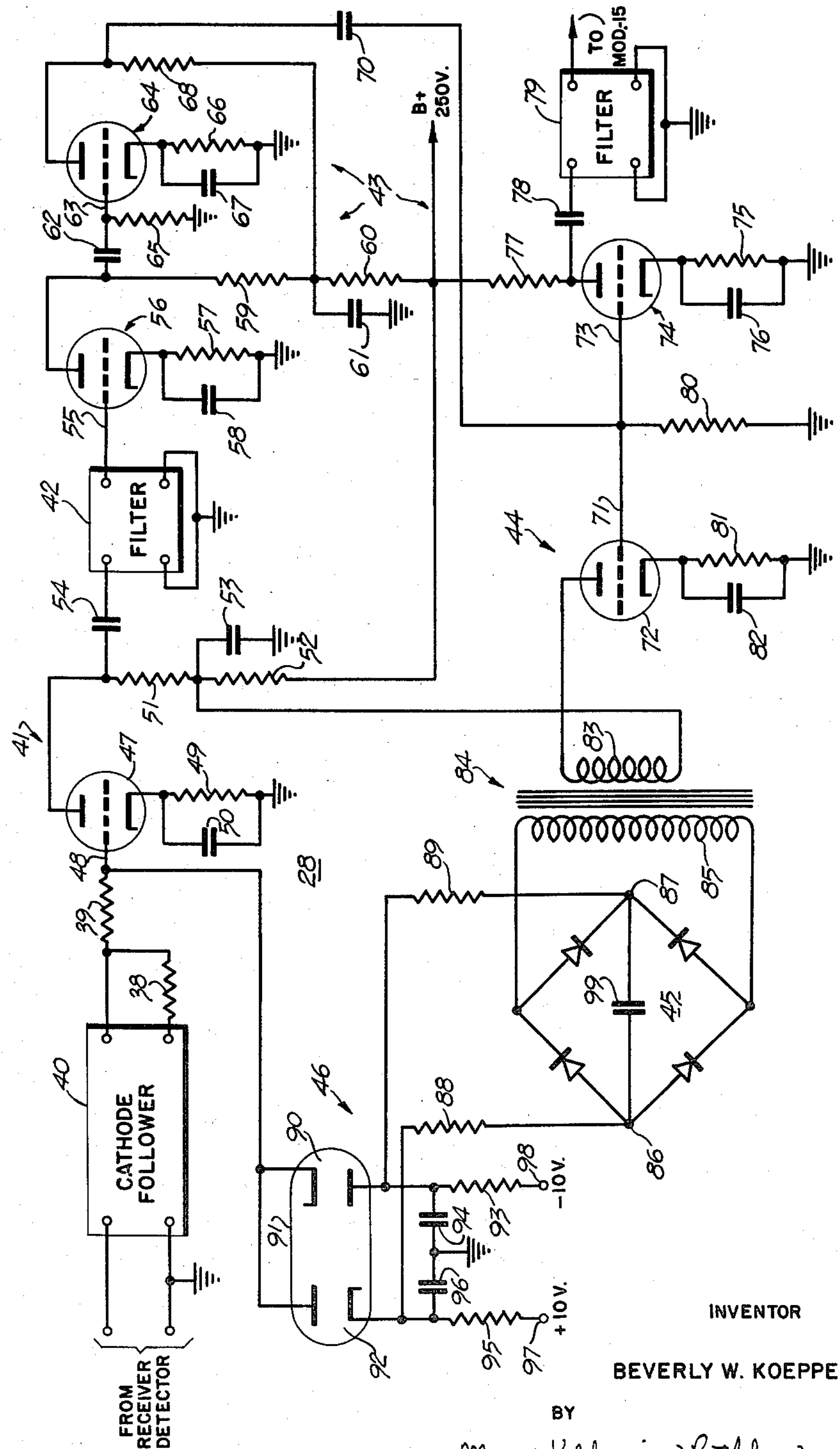
Figure 4:
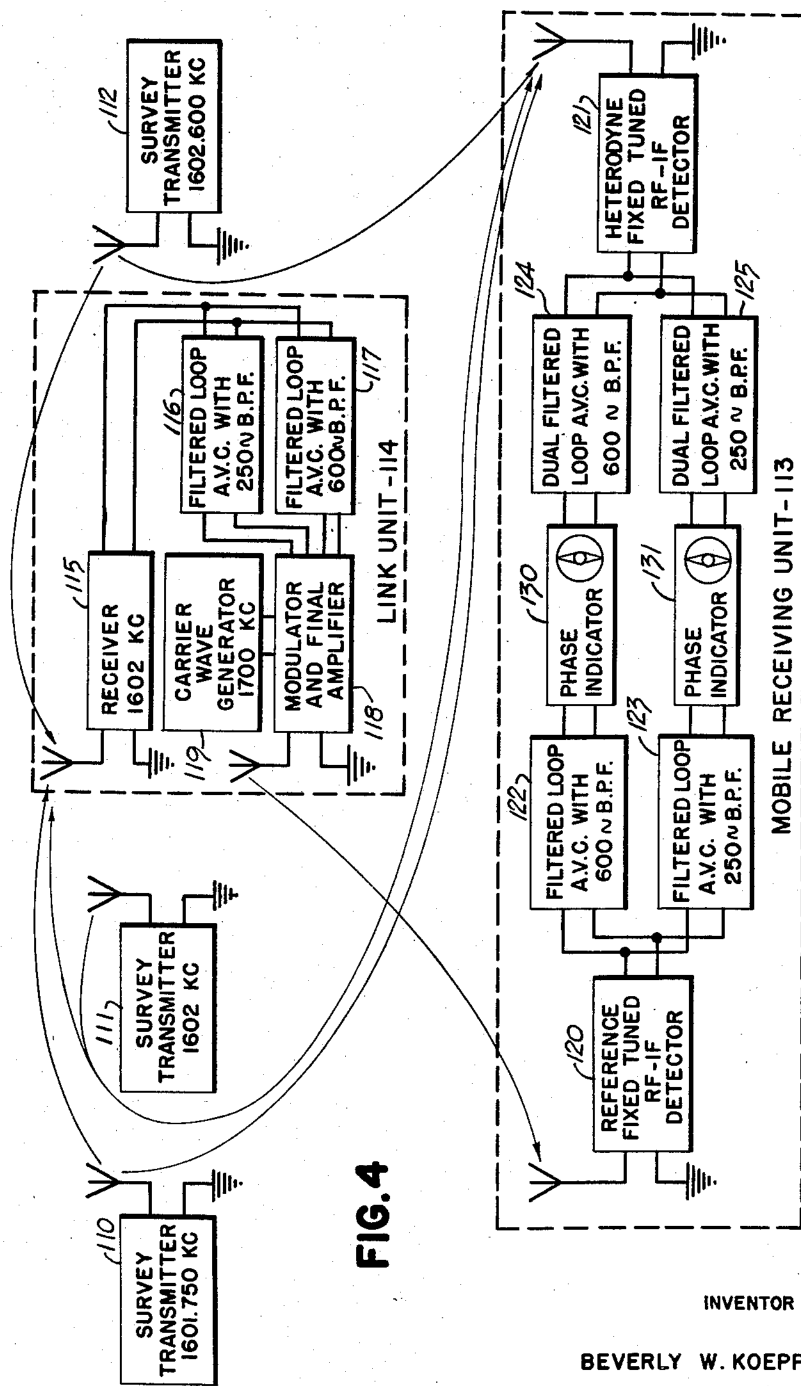

Fig. 3 is a partially schematic, partially diagrammatic representation of a filtered loop automatic volume control circuit characterized by the features of the present invention; and Fig. 4 is a diagrammatic representation similar to Fig. 1 illustrating the transmitting and receiving equipment making up still another radio position finding system constructed in accordance with the present invention.

Referring now to the drawings and more particularly to Fig. 1 thereof, the present invention is there illustrated as employed in a three foci, hyperbolic, continuous wave system for providing position information at any number of mobile receiving units 13, each of which may be carried upon a vessel or vehicle operating within the radius of transmission of a plurality of spaced apart transmitting units or stations 10, 11 and 12. The system illustrated in Fig. 1 is somewhat similar to that shown in the above identified Patent No. 2,513,317 to Hawkins and Finn. Thus, the transmitting units 10, 11 and 12 are preferably spaced apart approximately equal distances and are so positioned that an imaginary base line interconnecting the points of location of units 10 and 11 is angularly related to a similar base interconnecting the points of location of the units 11 and 12. As is described more fully hereinafter, the transmitting units 10 and 12 are equipped to continuously radiate position indicating signals in the form of carrier waves of different frequencies, whereas the transmitting unit 11 is equipped to alternately radiate two additional position indicating signals in the form of waves having still different frequencies.

In the drawings, solid line and broken line arrows have been employed to indicate the receiving points of signal acceptance and the sources of the accepted signals during the respective periods in which the transmitting unit 11 is alternately operated to radiate its different position indicating signals. Specifically, the transmitting equipment of the transmitting unit 10 includes a carrier wave generator or oscillator 14 and a modulator and power amplifier unit 15. Similarly, the transmitting equipment employed at the unit 12 comprises a carrier wave generator or oscillator 17 and a modulator and power amplifier unit 18. The transmitting unit 11 comprises two transmitters 20 and 21 for respectively radiating position indicating signals at two different frequencies together with switching means for alternately rendering these two transmitters operative. In the arrangement illustrated, switching of the two transmitters 20 and 21 for alternate operation is accomplished by alternately supplying anode potential to the plate circuits of the electron discharge tubes of the respective transmitters from the positive terminal 25 of the B+ or power supply, not shown, to a commutating ring 22 which is connected, as indicated by broken line 24, to be driven at constant speed by a synchronous motor and gear train unit 23. More specifically, the positive terminal 25 of the power supply is connected to a conductive segment **22*b* of the commutating ring 22, which segment spans slightly less than one-half the circumference of the ring. The remainder of the commutating ring is comprised of an insulating segment or section 22*a* indicated by cross hatching. At diametrically opposed points along the circumference of the ring, brushes 22*c* and 22*d* are provided which engage the ring periphery and are respectively connected to the positive bus conductors of the two transmitters 20 and 21 such that B+ is supplied alternately to the electron discharge tubes of these two transmitters, as the ring is rotated at constant speed. Since the conductive segment 22*b* extends slightly less than one-half the peripheral surface of the ring, it will be understood that a short off signal period is provided between successive periods during which the transmitters 20 and 21 are alternately operated, thus preventing simultaneous radiation of the waves by both of these transmitters. The periodicity with which the two transmitters 20 and 21 are alternately operated is, of course, dependent upon the speed of rotation of the commutating ring 22. Preferably, this ring is driven at a speed of one revolution per second such that the transmitters 20 and 21** are each rendered operative at one-half second intervals.

As indicated above, the carrier frequencies at which the four transmitters of the three transmitting units 10, 11 and 12 operate are all different. Preferably, however, these carrier waves are so paired that the frequencies of each pair are well within a single channel allocation of 10 kilocycles as specified by the Federal Communications Commission of the United States Government. To this end, the output frequency of the transmitter 20 and the output frequency of the transmitter at the unit 12, forming a first transmitter pair, may be 1601.875 and 1602.125 kilocycles, respectively, such that the difference frequency therebetween is 250 cycles while the output frequencies of the transmitter 21 and of the transmitter at the unit 10, forming a second transmitter pair, may be 1699.700 and 1700.300 kilocycles, respectively, such that the difference frequency therebetween is 600 cycles. It will be noted that the channels in which the two pairs of carrier frequencies fall are separated in the frequency spectrum by approximately 100 kilocycles, thus facilitating selective reception of these carrier pairs in the manner more fully explained below. The power of the four transmitters is such that the entire area in which position information may be desired aboard the vehicle or vessel carrying the receiving unit 13 is blanketed with waves radiated from each of the four transmitters and is also such that these waves have a field strength at all points within this area sufficient to permit reliable reception without requiring undue sensitivity of the receiving equipment.

In order to obviate the above-mentioned difficulties, attendant with phase synchronization of the position indicating signals radiated by the four transmitters, while at the same time eliminating the necessity for utilizing additional frequency channels, means are provided in the transmitting units 10 and 12 for alternately modulating the wave radiated by the transmitters of the units 10 and 12 with reference signals representative of the difference frequency between the pairs of position indicating signals. These reference signals may be received at the mobile receiving unit 13 together with the position indicating signals radiated from the four transmitters described above. The equipment provided at the transmitting unit 10 thus comprises a fixed tuned amplitude modulation receiver which includes an RF-IF strip and a detector collectively indicated by the block bearing the reference numeral 16. The RF portion of the receiver at the unit 10 is center tuned to a frequency of 1602 kilocycles and is thus adapted to receive the 1601.875 and 1602.125 kilocycle waves radiated by the transmitter 20 and by the transmitter at the unit 12, while at the same time rejecting the wave radiated by the transmitter 21 and that radiated by the transmitter at the unit 10. The beat frequency of 250 cycles between the two waves accepted in the radio frequency section of the receiver at the unit 10 is reproduced by the detector and delivered through a filtered loop AVC circuit constructed in accordance with the features of the present invention and indicated generally by the reference numeral 28. The filtered loop AVC circuit is adapted to pass the 250 cycle beat frequency signal developed at the output of the circuit 16 to the modulator and power amplifier unit 15 where this 250 cycle signal is amplitude modulated upon the carrier wave developed by the oscillator 14.

The filtered loop AVC circuit 28 is described more fully hereinafter, but briefly, its function is to control the amplitude of the 250 cycle beat signal supplied by the circuit 16, to reject other signals developed by the circuit 16, such, for example, as the modulation appearing upon the carrier wave radiated from the transmitting unit 12, and to prevent this last-mentioned signal from affecting the amplitude of or the gain control applied to the 250 cycle pass signal.

In similar manner, the transmitting unit 12 is equipped with a fixed tuned amplitude modulation receiver having an RF-IF and detector circuit all indicated by the reference numeral 19. The RF section of the circuit 19 is tuned to a frequency of 1700 kilocycles and hence, is adapted to accept the 1699.700 and 1700.300 kilocycle signals respectively radiated by the transmitter 21 and by the transmitter at the unit 10. Here again, the selectivity of the RF section of the circuit 19 is such that the signals radiated by the transmitter 20 and by the transmitter at the unit 12 are rejected. The beat frequency of 600 cycles between the two carrier waves passed by the RF section of the circuit 19 is developed by the detector and passed through a filtered loop AVC circuit indicated generally by the reference numeral 29 which is generally similar to the circuit 28 employed at the unit 10. Thus, the filtered loop AVC circuit 29 is adapted to pass the 600 cycle signal from the circuit 19 to the modulator and power amplifier 18 for amplitude modulation upon the carrier wave developed by the oscillator 17. The circuit 19 also reproduces the 250 cycle reference signal modulated upon the carrier wave radiated from the transmitting unit 10 and passes this 250 cycle signal to the filtered loop AVC circuit 29. The circuit 29 is designed to reject this 250 cycle signal and also to prevent this signal from having any effect upon its gain so that the gain of the circuit 29 is controlled solely by the 600 cycle beat frequency signal developed by the circuit 19.

Referring now particularly to the equipment making up the mobile receiving unit 13, it will be observed that this equipment includes a fixed tuned amplitude modulation receiver having an RF-IF and detector circuit indicated by the reference numeral 26. The RF section of the circuit 26 is center tuned to a frequency of 1700 kilocycles and, hence, is adapted to accept the 1699.700 kilocycle signal radiated by the transmitter 21 and the 1700.300 kilocycle signal radiated by the transmitter at the unit 10 while at the same time rejecting the 1601.875 and 1602.125 kilocycle signals respectively radiated from the transmitter 20 and the transmitter at the unit 12. The two signals accepted by the circuit 26 are heterodyned in the RF section thereof so that the 600 cycle difference frequency therebetween is developed by the detector and passed to the signal input terminals of a pair of filtered loop AVC circuits indicated at 32 and 33. The circuit 26 also reproduces the 250 cycle reference signal alternately modulated upon the carrier wave radiated from the unit 10 and passes this 250 cycle signal to the signal input terminals of the filtered loop AVC circuits 32 and 33. The filter 32 is adapted to reject the 600 cycle heterodyne or beat frequency signal and to pass the 250 cycle reference signal to the left hand set of signal input terminals of a phase indicating unit or meter 30. Moreover, as described more fully hereinafter, the gain of the circuit 32 is controlled solely by the amplitude variations of the 250 cycle reference signal and the 600 cycle input signal is prevented from effecting this gain. Similarly, the filtered loop AVC circuit 33 is adapted to pass the 600 cycle heterodyne signal through a second filtered loop AVC circuit 34 connected in series with the circuit 33 to the left hand set of signal input terminals of a phase indicating unit or meter 31. The circuits 33 and 34, of course, reject the 250 cycle reference signal reproduced by the circuit 26 and also prevent this signal from affecting the degree of volume control applied to the 600 cycle signal.

The mobile receiver unit 13 further comprises a second fixed tuned amplitude modulation receiver having an RF-IF and detector circuit indicated by the reference numeral 27. The RF portion of the detector 27 is center tuned to a frequency of 1602 kilocycles and is designed to accept the 1601.875 and 1602.125 kilocycle signals respectively radiated by the transmitter 20 and by the transmitter at the unit 12, while at the same time rejecting the 1699.700 and 1700.300 kilocycle signals respectively radiated by the transmitter 21 and by the transmitter of the unit 10. The 600 cycle reference signal alternately modulated upon the carrier wave radiated from the unit 12 is reproduced in the detector portion of the circuit 27 and is passed to the signal input terminals of a pair of filtered loop AVC circuits 35 and 36. Moreover, the two waves accepted by the RF portion of the circuit 27 are heterodyned with the result that the 250 cycle difference frequency therebetween is developed in the detector portion of the circuit 27 and is passed to the filtered loop AVC circuits 35 and 36. It is the function of the circuit 35 to reject the 250 cycle heterodyne signal and to pass the 600 cycle reference signal to the right hand set of signal input terminals of the phase meter 31. As previously indicated, the construction of the circuit 35 is such that its gain is not affected by the 250 cycle input signal with the result that the amplitude of the 600 cycle reference signal is properly controlled. The circuit 36 on the other hand is adapted to reject the 600 cycle reference signal reproduced by the circuit 27 and to pass the 250 cycle beat frequency signal through a second filtered loop AVC circuit 37 to the right hand set of signal input terminals of the phase indicator 30. Again the circuits 36 and 37 are so constructed that their gain is unaffected by the 600 cycle reference signal and, as a consequence, the gains of the circuits 36 and 37 are controlled solely by variations in the 250 cycle signal.

The phase indicators 30 and 31 are preferably of the type disclosed and claimed in United States Patent No. 2,551,211 to Hawkins and Koeppel, assigned to the same assignee as the present invention. As will be understood by those skilled in this art, the phase indicator 30 is adapted to respond to the 250 cycle signal passed by the circuit 32 and to the 250 cycle heterodyne signal passed by the circuits 36 and 37 by providing a position indication which is representative of the location of the mobile receiver unit 13 relative to adjacent hyperbolic isophase lines having foci at the units 11 and 12. In similar manner, the phase indicator 31 measures the phase relationship between the 600 cycle heterodyne signal passed by the circuits 33 and 34 and the 600 cycle reference signal passed by the circuit 35 and provides an indication which is representative of the position of the mobile receiver unit 13 relative to adjacent hyperbolic iso-phase lines having foci at the units 10 and 11. The two indications provided by the indicators 30 and 31 thus identify a pair of hyperbolic lines intersecting at the location of the mobile receiver unit 13, thus providing a position fix. Ambiguity resolution of the indications provided by the meters 30 and 31 may be resolved by resort to any of the numerous systems known in this art, or, alternatively, the rotor of each of these phase meters may drive a revolution counter in order to provide an indication of the number of iso-phase lines traversed by the mobile receiving unit as it moves from a known starting point.

In view of the foregoing description, it is believed that the operation of the system illustrated in Fig. 1 will be evident, but briefly, it will be understood that the transmitters 20 and 21 are rendered alternately operative as the synchronous motor and gear train unit 23 drives the commutating ring 22. During each interval when the transmitter 20 is in operation, signals of 1601.875 and 1602.125 kilocycles are accepted in the radio frequency section of the circuit 16 and of the circuit 27. In the circuit 16 the difference frequency signal of 250 cycles is reproduced and supplied through the filtered loop AVC circuit 28 to the modulator and power amplifier unit 15 for modulation as a reference signal upon the carrier wave developed by the oscillator 14. This modulated carrier wave signal is reproduced by the circuit 26 at the mobile receiving unit and the 250 cycle modulation component is passed through the filtered loop AVC circuit 32 to the phase meter 30. During the described interval the transmitter 21 is not in operation and, hence, no heterodyne or beat frequency signal is developed by the circuit 26 or by the circuit 19 at the unit 12.

A 250 cycle beat frequency or heterodyne signal resulting from heterodyning of the signals radiated by the transmitter 20 and the transmitter of the unit 12 in the radio frequency portion of the circuit 27 is passed through the series connected filtered loop AVC circuits 36 and 37 to the right hand set of signal input terminals of the phase meter 30. Thus, two signal voltages of identical frequency are applied to the opposed sets of input terminals of the latter phase meter with the result that a measurement of the phase angle existing therebetween is effected in order to provide an indication which is accurately representative of the position of the mobile receiving unit 13 between adjacent iso-phase lines having foci at the units 11 and 12.

At the end of the described transmitting interval the commutating ring 22 functions to interrupt the circuit delivering anode potential to electron discharge tube of the transmitter 20 with the result that signal radiation from this transmitter is terminated. When signal radiation by the transmitter 20 ceases, the heterodyning action occurring in the two circuits 16 and 27 is likewise terminated in order to interrupt the reference signal radiation by the transmitter at the unit 10 and also to interrupt the heterodyne or difference frequency signal being supplied to the phase meter 30. Thus, the latter phase meter is rendered ineffective further to change the setting of its indicating element.

A short time interval after operation of the transmitter 20 is stopped, the commutating ring 22 functions to deliver anode potential to the electron discharge tubes of the transmitter 21, thereby to initiate operation of the latter transmitter. With the transmitter 21 in operation a 1699.700 kilocycle position indicating signal is radiated which is accepted by the circuits 19 and 26. The circuit 19 functions to heterodyne the wave radiated by the transmitter 21 with the 1700.300 kilocycle signal continuously radiated by the transmitter at the unit 10 with the result that a 600 cycle beat frequency signal is reproduced and is passed through the filtered loop AVC circuit 29 to the modulator and power amplifier unit 18 for amplitude modulation as a reference signal upon the carrier wave developed by the oscillator 17. The circuit 27 accepts the modulated carrier wave radiated from the unit 12 and reproduces the modulation component thereof in the usual manner. This modulation component is passed through the filtered loop AVC circuit 35 to the right hand set of signal input terminals of the phase meter 31.

At the same time the 1699.700 and 1700.300 kilocycle signals respectively radiated by the transmitter 21 and by the transmitter at the unit 10 are both accepted by the circuit 26 and are heterodyned in the radio frequency section thereof to create a heterodyne or difference frequency signal which is passed through the series connected filtered loop AVC circuits 33 and 34 to the left hand set of signal input terminals of the phase meter 31. Thus, reference and heterodyne or difference frequency signals of identical frequencies are respectively applied to the opposed sets of signal input terminals of the phase meter 31 with the result that this meter measures the phase relationship therebetween and provides an indication accurately representative of the position of the mobile receiving unit 13 relative to adjacent hyperbolic iso-phase lines having foci at the units 10 and 11.

At the end of the described transmitting interval, the commutating ring 22 functions to break the power supply circuit to the plates of the tubes of the transmitter 21 in order to terminate the operation of this transmitter. When signal radiation by the transmitter 21 is thus halted, the heterodyning action occurring in the circuits 19 and 26 is instantly stopped to terminate the radiation of the 600 cycle reference signal of the transmitter of the unit 12 and to terminate the production of the difference or heterodyne signal at the output terminals of the circuit 26. Thus, the application of excitation signals to the input terminals of the phase meter 31 is interrupted with the result that no further change in the setting of the indicating element of this meter can take place. A short time interval after operation of the transmitter 21 is arrested the commutating ring 22 functions to recomplete the circuit to supply anode potential to the tubes of the transmitter 20 in order to reinitiate operation of this transmitter with the results described above.

As previously mentioned, one of the principal difficulties involved in the operation of switched type systems having the general arrangement illustrated in Fig. 1 has been, prior to the present invention, the problem of obtaining proper automatic volume control for the reference signals developed at the transmitting units 10 and 12 and for the reference and heterodyne signals developed at the mobile receiving unit 13. Thus, if the 250 cycle heterodyne signal developed by the circuit 16 were applied directly to the input terminal of a 250 cycle band pass filter for passage to the modulator and power amplifier unit 15, any variation in amplitude of this 250 cycle signal would cause the filter to introduce a phase shift in the signal supplied to the modulator which would also appear in the reference signal modulated upon the carrier wave radiated from the unit 10. The same condition would exist at the transmitting unit 12 with respect to the 600 cycle reference signal. Moreover, the problem would be even more acute at the circuits 26 and 27 of the mobile receiving unit 13. Thus, for example, if the output signals from the circuit 26 were supplied directly to band pass filters for separating the 250 cycle reference signal reproduced from the modulated carrier wave received from the unit 10 and the 600 cycle heterodyne signal developed from heterodyning the signals respectively received from the transmitter 21 and the transmitter at the unit 12, these filters, in response to amplitude variations of the signals from the circuit 26, would introduce a further phase shift in both the reference signal and the heterodyne signal supplied to the phase meters 30 and 31. The same condition would prevail at the circuit 27 and, as a result, the phase meters would be excited with signals that had exerienced undesired phase shifts both in the reference signals and the heterodyne or beat signal. Thus, the position indications provided by the phase meters 30 and 31 would be inaccurate. To meet this problem, the amplitude of the signals supplied to the various filters at the link transmitting units 10 and 12 and at the mobile receiving unit 13 are usually controlled, as, for example, by means of an automatic volume control circuit prior to their introduction to these band pass filters. However, as will be apparent from the foregoing description, each of these automatic volume control circuits is supplied with signals of different frequency during the two intervals of operation referred to above. Thus, for example, during the first interval of operation the circuit 16 at the unit 10 develops a 250 cycle beat frequency from heterodyning the two waves respectively radiated by the transmitter 20 and by the transmitter at the unit 12, while during the second interval of operation this same circuit develops or reproduces the 600 cycle modulation signal appearing upon the carrier wave radiated from the unit 12. If these two signals were both applied to an automatic volume control circuit of conventional construction possessing a long time constant relative to the switching rate of the transmitters 20 and 21, their amplitudes would be controlled in accordance with some average value of the two input signals. Thus, if the 250 cycle signal were weaker than the 600 cycle modulation component reproduced by the circuit 16 then the 250 cycle signal would be over attenuated and the carrier wave radiated from the transmitting unit 10 would be undermodulated with the result that a weak reference signal would be produced at the mobile receiving unit 13. The use of a short time constant automatic volume control circuit does not offer a satisfactory solution to this problem in view of the fact that such a circuit introduces large transients which would appear in the reference signal radiated from the unit 10 and, hence, would be reproduced and presented to the phase meter 30 at the mobile receiving unit. The same problem, is, of course, encountered at the transmitting unit 12 where the circuit 19 reproduces the 250 cycle reference signal modulated upon the wave radiated from the unit 10 during the first interval of operation and produces the desired 600 cycle beat signal during the second interval of operation. Since the reference or link transmitting unit receiving equipment is located at a fixed position and the transmitting stations 10, 11 and 12 are located approximately equal distances apart at fixed points the signals being developed by the circuit 16 during the two intervals of operation are of nearly the same magnitude, and this is particularly true if the RF and IF circuits includes one or more conventional automatic volume control networks or circuits. As a result of this signal equality the above described problem of securing adequate modulation is generally not too severe at either of the units 10 or 12. Thus, it becomes essential to employ the circuits 28 and 29 of the present invention only in exceptional cases where the output signals developed by the receiving circuits 16 and 19 during the different intervals of operation are unequal in amplitude.

At the mobile receiving equipment 13 however, a somewhat different situation exists, due to the fact that the relative magnitude of the heterodyne signals developed by the circuits 26 and 27 changes with the position of the mobile receiving unit and, in addition, the ratio of the heterodyne signal to the reproduced reference signal will also change as a function of the changing position of the mobile receiving unit. Thus, wide variations in the amplitude of the audio signals being developed during the two intervals of operation are encountered. As previously mentioned, conventional automatic volume control circuits employed prior to the present invention adjust themselves in accordance with some average of the signals developed during the two intervals and in case an extreme disparity in amplitude exists between these signals, the amplitude reduction provided by the AVC circuit is insufficient for the stronger signal and is too great for the weaker signal. As a result, the weaker signal may be lost or rendered ineffective while the stronger signal overdrives the subsequent filtering device in order to introduce the above described phase shifts which appear in the signal passed to the phase indicating devices. The signal level of the weaker signal may drop below the level necessary to operate the phase meter properly under the conditions described. As previously mentioned the use of a short time constant AVC circuit, while it tends to follow the variations in the signal levels produced during the two operating intervals, introduces major problems in high level transient signals which are generated before the AVC circuit can act on each half of the switching cycle.

It is the function of the circuits 28 and 29 at the units 10 and 12, respectively, to eliminate the above described problem at the link transmitting units and, in similar manner, the circuits 32, 33, 34, 35, 36 and 37 are adapted to solve the described problems at the mobile receiving unit 13. These circuits are generally similar in construction, the main difference being in the frequency to which the band pass filter incorporated in each circuit is tuned. Accordingly, a detailed description of the circuit employed at one of the units is deemed to be sufficient. Thus, referring first to the equipment provided at the unit 10 it will be observed that the audio signals developed by the detector of the circuit 16 are passed to a cathode follower 40 which serves as an isolating circuit between the output of circuit 16 and the input to the automatic volume control circuit 28. The output of the cathode follower 40 is supplied to a controlled amplifier 41 which has its gain automatically controlled in response to D.C. control signals developed by the filtered loop AVC circuit in the manner described below. The signal output of the controlled amplifier 41 passes through a band pass filter 42 center tuned to a frequency of 250 cycles to an output amplifier indicated generally by the reference numeral 43. A portion of the 250 cycle signal in the output amplifier 43 is fed through an AVC amplifier 44 for amplification and passage to a bridge rectifier 45 where a D.C. control signal is developed having an amplitude which is a function of the amplitude of the 250 cycle signal passed by the filter 42. This D.C. control signal flows through an AVC control diode network 46 having a relatively long time constant, that is a time constant which is long relative to the switching rate at which the transmitters 20 and 21 of the unit 11 are alternately operated. The D.C. control signal developed by the AVC control diode network 46 is employed to control the gain of the controlled amplifier 41 in accordance with the amplitude of the 250 cycle signal passed by the filter 42. The 600 cycle reference signal developed by the circuit 16 from the modulated carrier wave radiated by the unit 12 is, of course, passed through the cathode follower stage 40 and through the controlled amplifier 41, but it is rejected by the band pass filter 42 and as a result it has no effect upon the magnitude of the D.C. control signal developed by the bridge rectifier circuit 45 and the AVC control diode network 46. The 600 cycle signal is not passed to the output amplifier 43 and, hence, does not reach the modulator unit 15. In view of the foregoing description it will be observed that the gain or amplitude control provided by the filtered loop AVC circuit 28 is independent of the magnitude of the 600 cycle signal reproduced by the circuit 16 and hence is a function solely of the amplitude of the 250 cycle signals. As a result, the above described disadvantages of the prior art arrangements in which the AVC circuit tends to strike some average between the two input signals is completely eliminated.

Referring next to Fig. 3, which schematically illustrates the filtered loop AVC circuit 28, it will be observed that the controlled amplifier 41 there shown comprises a triode 47 the control grid 48 of which is excited by the signal developed across resistor 38 as a result of excitation from the cathode follower 40. The cathode circuit of the triode 47 includes a self-biasing network consisting of resistor 49 connected in parallel with capacitor 50. The plate circuit of the triode 47 includes a plate load resistor 51 which is connected through another resistor 52 to the positive or B+ terminal of a suitable power supply, not shown. In one application of the present invention a 250 volt B+ was employed. A shunting capacitor 53 connected at the junction of resistors 51 and 52 by-passes undesired high frequency components to ground in conventional manner. The plate circuit of the triode 47 is coupled through capacitor 54 to the filter 42 which, as previously described, is of conventional construction and is adapted to pass the 250 cycle signal developed by the circuit 16 and to reject the 600 cycle signal developed thereby. The output of the filter 42 flows to the control grid 55 of a triode 56 in the output amplifier 43. A self-biasing network, consisting of resistor 57 connected in parallel with capacitor 58, is connected in the cathode circuit of the triode 56. The plate circuit of this triode includes a plate load resistor 59 connected through a second resistor 60 to the B+ terminal while a shunting capacitor 61 again by-passes high frequency components to ground. The plate circuit of the triode 56 is coupled through capacitor 62 and to the control grid 63 of a triode 64 in a second amplifying stage of the output amplifier 43. The control grid 63 is connected through a grid leak resistor 65 to ground in the usual manner. A self-biasing network consisting of resistor 66 connected in shunt with capacitor 67 is provided in the cathode circuit of the triode 64. Plate load resistor 68 of the latter triode is connected to the junction between resistors 59 and 60. The plate of the triode 64 is coupled through capacitor 70 to the control grid 71 of a triode 72 in the AVC amplifier 44 and, also to the control grid 73 of a triode 74 in the output stage of the output amplifier 43. Thus, it will be observed that, in the embodiment of the invention illustrated, the triodes 56, 64, and 74 and their associated component elements make up the output amplifier 43 represented by a single block in Fig. 1. The cathode circuit of the triode 74 includes a self-biasing network consisting of the parallel connected resistor 75 and condenser 76. The plate circuit of the triode 74 includes a plate load resistor 77 connected to the B+ terminal. The plate circuit may also be coupled through a capacitor 78 to a second band pass filter 79 which is tuned to a frequency of 250 cycles and has its output connected to the signal input terminals of the modulator and power amplifier unit 15. Thus, in view of the foregoing description it will be observed that the 250 cycle signal passed by the filter 42 is amplified by the triode 56, is further amplified by the triode 64 and is amplified again by the triode 74 after which this signal is passed through the filter 79 to the modulator circuit 15 for amplitude modulation upon the carrier wave radiated from the unit 10. A portion of the 250 cycle signal appearing upon the control grid 73 of the final stage of the amplifier 43, as previously indicated, is passed to the triode 72. To this end the signal appearing upon the grid 73 is developed across a grid leak resistor 80 which is also connected in the grid circuit of the triode 72. Thus, the triodes 72 and 73 are excited by identical input signals. The cathode circuit of the triode circuit 72 includes a self-biasing network consisting of resistor 81 connected in parallel with capacitor 82. The resistor 81 is slightly larger than the corresponding resistor 75 in the cathode circuit of the triode 74 and as a result the self bias on the triode 72 is somewhat greater than the bias on the triode 74. In any event, the signal appearing on the grid 71 is amplified by the triode 72 and is developed across the primary winding 83 of an output transformer 84 connected in the plate circuit of the triode 72. To supply plate voltage for the triode 72 one end of the primary winding 83 is connected to the junction between resistors 51 and 52 in the plate circuit of the controlled amplifier 41. The 250 cycle signal developed across the secondary winding 85 of the transformer 84 is applied across a bridge type rectifier 45 which is of conventional construction. This bridge type rectifier develops between its output terminals 86 and 87 a unidirectional or D.C. signal having an amplitude corresponding to the amplitude of 250 cycle signal supplied to the grid circuit of the AVC amplifier 44. The described D.C. signal is passed through resistors 88 and 89 to the AVC control diode network 46. Specifically, the terminal 87 is connected through resistor 89 to the plate of one diode section 90 of a dual diode tube 91 while terminal 86 is connected through resistor 88 to the cathode of a second diode section 92 of the tube 91. The plate of diode section 92 and the cathode of diode section 90 are connected directly together and to the control grid 48 of the controlled amplifier 41, in order to control the gain of the latter amplifier in the manner described below.

The plate section of the diode 90 is connected through a resistor 93 to terminal 98 having a small negative, D.C. potential which in the embodiment illustrated is indicated as minus 10 volts supplied from a battery or from a negative terminal of the power supply. The plate of the diode 90 is shunted to ground through a capacitor 94. In similar manner the cathode of section 92 is connected through resistor 95 to terminal 97 having a small positive potential which is indicated as plus 10 volts. A filtering capacitor 96 is connected between the cathodes of section 92 and ground.

The automatic volume control circuit illustrated in Fig. 3 is therefore of the general type disclosed in United States Patent No. 2,554,905 to Hawkins and Cornett issued May 29, 1951, and assigned to the same assignee as the present invention. Thus, as described in detail in the latter patent, the AVC control diode network 46 actually functions as a variable impedance connected in shunt with the input circuit of the triode 47 in the controlled amplifier 41. The two rectifiers 90 and 92 of the network 46 are oppositely poled and are connected in series with a biasing circuit which includes the resistors 93 and 95 and the capacitors 94 and 96. The time constant of the biasing circuit is determined by the value of the resistors and capacitors and, as previously indicated, it is relatively high in comparison with the switching rate or at the rate at which the transmitters 20 and 21 are alternately operated. As will be understood by those skilled in this art, the diode rectifiers 90 and 92 have impedances which vary as a function of the magnitude of current flowing therethrough and, hence, as a function of the bias voltages impressed thereacross. Regarding these rectifiers and their associated biasing circuits as a series network, it will be noted that the positive and negative voltages supplied to the biasing network normally prevent current conduction through the space current paths of the rectifiers 90 and 92. Thus, normally the variable impedance network presents a very high shunt impedance across the input circuit of the controlled amplifier stage 41 and more particularly between the control grid 48, thereof, and ground. By suitable choice of the voltages applied to the biasing network any desired ratio may be established which must be exceeded by a biasing voltage of opposite polarity before space current flow through the rectifiers 90 and 92 may be initiated to lower the shunt impedance across the input circuit of the controlled amplifier 41.

The output of the bridge rectifier 45 is employed for the purpose of overcoming the biasing voltages provided by the biasing network to thus effect current flow through the rectifiers 90 and 92 when the signal voltage appearing at the input side of the AVC amplifier 44 exceeds a certain predetermined value, and of thereafter varying the magnitude of current flow through the rectifiers as a direct function of the amplitude of this signal voltage. As will be evident from an examination of the circuit diagram illustrated in Fig. 3, the rectified signal voltage appearing across terminals 86 and 87 is applied to the biasing circuit in opposition to the voltages supplied from the terminals 97 and 98.

In a particular embodiment of the present invention which was found to provide satisfactory results the component elements of the schematic diagram of the automatic volume control circuit illustrated in Fig. 3 were as follows, although it should be clearly understood that the values of these elements are merely illustrative.

*Table of components*

| Component | Unit | Value |
|---|---|---|
| Tubes 47, 56, 64, 72 and 74 | | Type 5814 |
| Tube 91 | | Type 12AL5 |
| Resistors 38 and 81 | kilohms | 4.7 |
| Resistors 49, 57, 66 and 75 | do | 3.3 |
| Resistors 51 and 77 | do | 33 |
| Resistors 52 and 60 | do | 15 |
| Resistors 59 and 68 | do | 100 |
| Resistors 88 and 89 | do | 51 |
| Resistors 93 and 95 | do | 470 |
| Resistor 80 | do | 510 |
| Resistor 39 | do | 680 |
| Capacitors 50, 53, 58, 61, 67, 76, 82 and 99 | microfarads | 10 |
| Capacitors 94 and 96 | do | 30 |
| Capacitors 54, 62, 70 and 78 | do | 0.1 |

Considering briefly the operation of the described gain control circuit, it will be understood that when a signal of 250 cycles is applied across the input circuit of the AVC amplifier 44 a direct current control signal having an amplitude proportional to this input signal is developed across terminals 86 and 87 of the bridge type rectifier 45. As long as the magnitude of the D.C. control voltage between terminals 86 and 87 does not exceed the total voltage applied between terminals 97 and 98 the rectifiers 90 and 92 remain non-conductive to prevent any decrease in the shunt impedance across the input circuit of the controlled amplifier 41.

If, however, the voltage appearing across terminals 86 and 87 exceeds the voltage applied between terminals 97 and 98 a net voltage is impressed across the rectifiers 90 and 92 of the proper polarity to effect current conduction. As a consequence, the impedances of these rectifiers decrease to produce a corresponding decrease in the impedance between the control grid 48 and ground. The extent to which the impedances of the rectifiers 90 and 92 are decreased varies as a direct function of the magnitude of the control current therethrough. Thus, during a rising signal amplitude period, current conduction through the rectifiers 90 and 92 is progressively increased to effect a progressive decrease in the impedance of the shunt network connected between the control grid 48 and ground. Conversely, during a period of decreasing signal amplitude, current conduction through the rectifiers 90 and 92 is correspondingly decreased to effect an increase in the impedance connected between control grid 48 and ground.

The effect of decreasing the impedance of the shunt network in the manner just explained, is that of decreasing the ratio between the voltage appearing between control grid 48 and ground and that appearing across resistor 38. In other words, a portion of the input signal supplied to the control grid 48 is diverted through the shunt network, and, accordingly as the impedance of the network is decreased the strength of the signal developed across the resistor 38 is correspondingly decreased. Thus, the shunt network has the effect of lowering the proportion of the available signal voltage which is impressed between the control grid 48 and ground when the signal amplitude is increased. The converse action obviously occurs when the amplitude of the signal supplied to the AVC amplifier 44 is decreased.

It will also be apparent that the 600 cycle signal developed by the circuit 16 is rejected by the filter 42 and does not appear across the input terminals to the AVC amplifier 44 with the result that this 600 cycle signal has no effect upon the conduction of the diodes 90 and 92. Therefore, the gain of the controlled amplifier 41 is varied solely in response to amplitude variations of 250 cycle signal developed by the circuit 16. The controlled amplifier 41, the filter 42, the triodes 56 and 64, the AVC amplifier 44, the bridge rectifier 45 and the AVC control diode 46 and their associated components may be collectively referred to as a filtered loop AVC circuit since the control voltage developed actually result from filtering out the undesired signals and producing a D.C. control signal which varies solely as a function of the desired A.C. signal passed through the loop.

Figure 2:
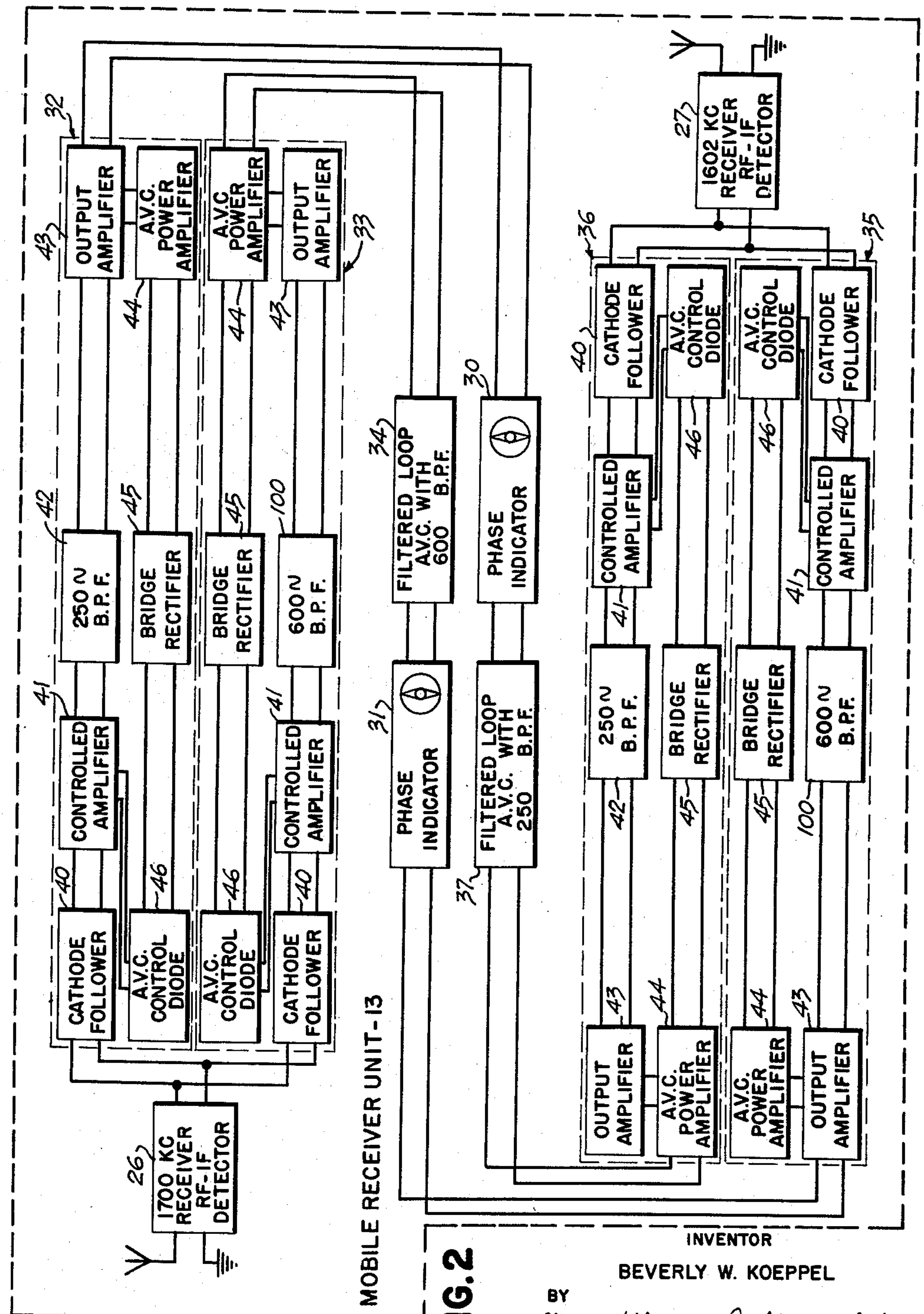
Fig. 2 is a diagrammatic and more detailed representation of the mobile receiving equipment employed in the system illustrated in Fig. 1.

As previously mentioned, a similar filtered loop AVC circuit is employed at the transmitting unit 12 and this circuit is in all respects identical to the circuit 28 just described, except that the filtered loop includes a 600 cycle band pass filter 100 in place of the 250 cycle filter 42 employed in the circuit 28. All other components of the circuit 29 are identical to the corresponding components of the circuit 28 and, accordingly, identical reference characters have been employed. The filtered loop AVC circuit 32 employed at the mobile receiving unit is identical to the unit 28 described above as will be evident by reference to Fig. 2 which discloses the circuit 32 in some detail. Again, identical reference numerals have therefore been employed. The filtered loop AVC circuit 33 is identical to the circuit 29 and includes a 600 cycle band pass filter 100.

To provide balance in the heterodyne and reference signals supplied to the opposed set of signal input terminals of the phase meter 31, the output of the filtered loop AVC circuit 33 is passed through a second identical filtered loop AVC circuit 34 connected in series with the circuit 33. Thus, the 600 cycle reference signal supplied to the right hand set of signal input terminals of phase meter 31 passes through one filtered loop AVC circuit 29 before it is modulated upon the carrier wave radiated from the unit 12 and, in addition, it passes through a second filtered loop AVC circuit 35, which is, of course, identical to the circuit 29, before it is applied to the phase meter. Thus, it is desirable that the heterodyne signal pass through the same number of AVC circuits in order to maintain the system balance, that is, to insure that the heterodyne signals flow through substantially the same circuits as the reference signals in order to equalize any phase shifts introduced by such circuits. In this manner the accuracy of the position indications provided by the phase meter 31 is maintained.

The filtered loop AVC circuit 36 is identical to the circuit 28 AVC described above and again corresponding elements have been designated by the same reference character. The signals passed by the filtered loop AVC circuit 36 are passed and supplied through a second filtered loop AVC circuit 37 which is identical to the circuit 36 in order to effect the aforementioned balance in the heterodyne and reference signals supplied to the phase meter 30. Specifically, the reference signal supplied to the left hand set of signal input terminals of the phase meter 30 passes through the filtered loop AVC circuit 28 at the transmitting unit 10 prior to its modulation upon the carrier wave radiated from this unit and it also passes through the filtered loop AVC circuit 32 in the manner previously described. The heterodyne signal developed by the receiver 27 is therefore passed through two series connected filtered loop AVC circuits 36 and 37 in order to effect the described balance.

While the present invention has been described for use in switched type radio position finding systems, it should be recognized that it will also find application in any type system employing receiving equipment for reproducing a plurality of signals of different magnitudes wherein it is desired to pass only one of these signals through an AVC circuit having a gain which should not be affected by the rejected signals. Thus, in Fig. 4 the invention is illustrated as used in a radio position finding system of the type shown in Hawkins Patent No. 2,513,316, issued July 4, 1950 and assigned to the same assignee as the present invention. The system there illustrated is adapted to provide position information at any number of mobile receiving units 113 each of which is carried upon a vessel or vehicle operating within the radius of transmission of three spaced apart survey transmitters 110, 111 and 112 and a link transmitting unit 114. The transmitters 110, 111 and 112 are preferably spaced apart approximately equal distances and are so positioned that an imaginary base-line joining the units 110 and 111 is angularly related to a similar base line joining the units 111 ad 112. The unit 114 is spaced some distance from all three of the survey transmitters. The units 110, 111 and 112 are equipped continuously to radiate position indicating signals having frequencies of 1601.750, 1602 and 1602.600 kilocycles respectively, such that all of these signals fall within a single 10 kilocycle channel.

To obviate the above-mentioned difficulties attendant with phase synchronization of the three position indicating signals just described while at the same time eliminating the necessity for utilizing more than one additional channel frequency, the link unit 114 is equipped to radiate a carrier wave of 1700 kilocycles which is modulated with reference signals representative of the difference frequencies between the different pairs of position indicating signals radiated from the survey transmitters 110, 111 and 112. To this end the link unit 114 is provided with a fixed tuned amplitude modulation receiver 115 which is center tuned to a frequency of 1602 kilocycles and is adapted to accept the position indicating signals radiated from the three survey transmitters. The receiver 115 functions to heterodyne the three accepted waves in pairs to produce 250, 600 and 850 cycle beat signals which may be supplied to the signal input terminals of a pair of filtered loop AVC circuits 116 and 117. The filtered loop AVC circuit 116 is identical in construction to the circuit 28 previously described while the filtered loop AVC circuit 117 is identical to the circiut 29 previously described. The circuit 116 is adapted to pass the 250 cycle beat signal developed by receiver 115 to a modulator and final amplifier unit 118 which is also excited by carrier wave signals generated by an oscillator or signal generator 119. As previously indicated, the AVC circuit 116 is adapted to reject both the 600 cycle and 850 cycle beat signals developed by the receiver 115 and also to prevent these particular signals from affecting the automatic volume control applied to the 250 cycle signal.

In similar manner, the filtered loop AVC circuit 117 is adapted to pass the 600 cycle beat signal developed by the receiver 115 to the modulator and power amplifier unit 118 where it is modulated upon the 1700 kilocycle signal developed by the carrier wave generator 119 simultaneously with the 250 cycle reference signal passed by the circuit 116. The circuit 117 functions in the manner previously described to reject both the 250 and 850 cycle signals developed by the receiver 115 and also functions to prevent these signals from affecting the AVC circuit, whereby the gain of this circuit is a function solely of the amplitude of the 600 cycle signal.

The mobile receiving unit 113 comprises a fixed tuned amplitude modulation receiver, the RF-IF and detector portion of which is indicated by the reference character 120 together with a second fixed tuned amplitude modulation receiver having an RF-IF and detector portion indicated by the reference numeral 121. The RF section of the receiver 120 is tuned to a frequency of 1700 kilocycles and is sufficiently selective to reject the signals radiated by the three survey transmitters while accepting the modulated carrier wave radiated from the link unit 114. The RF portion of the receiver 121 on the other hand is center tuned to a frequency of 1602 kilocycles and is adapted to reject the modulated carrier wave radiated from the unit 114 while accepting the position indicating signals radiated from all three of the survey transmitters 110, 111 and 112. The circuit 120 reproduces the 250 cycle and 600 cycle reference signals modulated upon the carrier wave received from the link unit 114 and passes these signals to the signal input terminals of a pair of filtered loop AVC circuits 122 and 123. The circuit 122 is identical to the filtered loop AVC circuit 29 illustrated in Fig. 1 while the circuit 123 is identical to the AVC circuit 28. The circuit 122 passes the 600 cycle reference signal to the left hand set of signal input terminals of a phase indicator 130 while at the same time rejecting the 250 cycle reference signal. Here again the gain of the circuit 122 is controlled exclusively by the variations in amplitude of the 600 cycle reference signal and is independent of variations in the 250 cycle reference signal. The circuit 123 is adapted to pass the 250 cycle reference signal to the left hand set of signal input terminals of a phase meter or indicator 131 while at the same time rejecting the 600 cycle reference signal. Once again, the gain of the circuit 123 is controlled solely by amplitude variations in the 250 cycle reference signal and is unaffected by amplitude variations in the 600 cycle signal. The circuit 121 heterodynes the two carrier waves to which it is responsive to produce in the detector portion thereof 250, 600 and 850 cycle beat or heterodyne frequency signals which are passed to the signal input terminals of a pair of circuits 124 and 125 each of which includes a pair of series connected filtered loop AVC circuits. The circuit 124 thus comprises a pair of filtered loop AVC circuits like the circuit 29 previously described for the purpose of providing the above described balance in the heterodyne and reference signals supplied to the phase meter 130. Specifically, the reference signal supplied to the left hand set of signal input terminals of the phase indicator 130 is passed through an AVC circuit at the link unit 114 and is also passed through an additional AVC circuit at the mobile receiver unit 113. Thus, it is desirable to pass the heterodyne signals developed by the circuit 121 through a similar pair of AVC circuits before they are applied to the right hand set of signal input terminals of the phase indicator 130. In view of the foregoing description it will be recognized that the opposed sets of the phase indicator 130 are excited by signals of identical frequency, i.e. 600 cycles, and, as a result, this phase indicator measures the phase relationship between the input signals and provides an indication which is accurately representative of the position of the mobile receiving unit relative to adjacent hyperbolic iso-phase lines having foci at the points of location of the survey transmitters 111 and 112. Obviously the dual filtered loop AVC circuit 124 functions to reject the 250 cycle and 850 cycle signals developed by the circuit 121 and to prevent these signals from affecting the gain control applied to the 600 cycle signals.

In similar manner the 250 cycle signal developed by the circuit 121 is passed to the right hand set of signal input terminals of phase indicator 131 through a dual filtered loop AVC circuit 125 consisting of a pair of series connected circuits each of which is identical to that indicated at 28 in Fig. 1. The purpose of employing two series connected AVC circuits is again to provide a balance between the reference and heterodyne signals supplied to the phase indicator 131. In any event, the phase indicator 131 is excited by reference and heterodyne signals of identical frequency i.e., 250 cycles, with the result that this indicator measures the phase relationship between the input signals and provides an indication accurately representative of the location of the mobile receiving unit 113 relative to adjacent hyperbolic isophase lines having foci at the survey transmitters 110 and 111. The dual filtered loop AVC circuit 125 is, of course, designed to reject the 600 and 850 cycle signals developed by the circuit 121. Moreover, the gain of the circuit 125 is controlled exclusively by the 250 cycle signal and is independent of amplitude variations in either the 600 or 850 cycle input signals.

The two indications provided by the phase meters 130 and 131 thus define a pair of hyperbolic lines intersecting at the point of location at the mobile receiver unit with the result that a position fix is established. Here again ambiguity of the position indications may be resolved by employing any of the systems heretofore proposed for that purpose, or, alternatively, the rotatable indicating elements of the phase meters 130 and 131 may be equipped to drive a revolution counter for indicating the number of iso-phase lines traversed by the mobile receiving unit 113 during its movement through the survey area.

Since the link unit 114 is preferably located approximately equal distances from the survey transmitters 110, 111 and 112 and moreover, since the receiver 115 is usually provided with AVC circuits in the RF and IF sections to control the amplitude of the signals being heterodyned, it is likely that the output signals from the receiver 115 will be of substantially the same amplitude and, if this is the case, it is not necessary to employ the filtered loop AVC circuits 116 and 117 at the link unit. Moreover, since the circuit 120 at the mobile receiving unit develops its reference signal from a modulated carrier wave radiated from a single point and since the amplitude of the reference signals is controlled by suitable circuits at the link unit the output signals of the circuit 120 will generally be of the same amplitude and, if this is the case, it is not necessary to employ filtered loop AVC circuits of the type indicated at 122 and 123. In this instance, a conventional AVC circuit and a simple band pass filter may be employed in which case one of the two filtered loop AVC circuits employed in each of the circuits 124 and 125 may be replaced with a simple filter and a conventional AVC circuit so that the system balance is still maintained. One of the filtered loop AVC circuits of each of the circuits 124 and 125 is retained since the amplitudes of the heterodyne signals developed by receiver 121 are likely to be different particularly when the mobile receiving unit is located relatively close to one of the end survey transmitters, i.e., one of the transmitters 110 or 112, and relatively remote from the other end transmitter. Moreover, since there are no disadvantages in employing the filtered loop AVC circuits in the manner illustrated, such circuits may be used in the interest of duplicating as many component parts as possible thereby permitting a minimum number of spare parts to be carried aboard the vessel or vehicle carrying the mobile receiving unit 113.

While particular embodiments of the invention have been shown and described it will be understood, of course, that the invention is not limited thereto since many modifications may be made and it is therefore contemplated by the appended claims to cover any such modifications as fall within the true spirit and scope of the invention.

Having thus described the invention, what is desired to be secured by Letters Patent of the United States is as follows:

I claim:

1. Receiving apparatus for use in a radio position determining system of the type wherein a plurality of signals are simultaneously supplied to the receiving apparatus, said receiving apparatus comprising means responsive to said signals for producing at least two relatively low frequency outputs, and an automatic volume control circuit having input terminals to which are applied both of said low frequency outputs, said automatic volume control circuit including a filtered loop tuned to one of said low frequency outputs for developing a control signal which varies as a function of the amplitude of said one signal but is not affected by the other of said low frequency outputs, and means for controlling the gain of said automatic volume control circuit in response to variations of said control signal so that said gain is independent of variations in said other output.

2. Receiving apparatus for use in a radio position determining system of the type wherein a plurality of signals are simultaneously supplied to the receiving apparatus, said receiving apparatus comprising means responsive to said signals for producing at least two relatively low frequency outputs, and an automatic volume control circuit having input terminals to which are applied both of said low frequency outputs, said automatic volume control circuit including means for developing a feedback signal which varies as a function of one of said outputs and is not affected by the other of said outputs, and means responsive to said feedback signal for controlling the gain of said automatic volume control so that said gain is independent of variations in said other output.

3. Receiving apparatus for use in a radio position determining system of the type wherein a plurality of signals are simultaneously supplied to the receiving apparatus, said receiving apparatus comprising means responsive to said signals for producing at least two relatively low frequency outputs, and an automatic volume control circuit having input terminals to which are applied both of said low frequency outputs, said automatic volume control circuit including means for varying the gain of said automatic volume control in response to variations in only one of said outputs so that said gain is independent of variations in the other of said outputs.

4. Receiving apparatus for use in a radio position determining system of the type wherein a plurality of signals are simultaneously supplied to the receiving apparatus, said receiving apparatus comprising means responsive to said signals for producing at least two relatively low frequency outputs, and an automatic volume control circuit having input terminals to which are applied both of said low frequency outputs, said automatic volume control circuit including an amplifier, a filter tuned to one of said outputs and excited by signals from said amplifier, and means for converting signals from said filter to D.C. control signals and for supplying said control signals to said amplifier in order to vary its gain in accordance with variations in said one output.

5. Receiving apparatus for use in a radio position determining system of the type wherein a plurality of signals are simultaneously supplied to the receiving apparatus, said receiving apparatus comprising means responsive to said signals for producing at least two relatively low frequency outputs, and an automatic volume control circuit having input terminals to which are applied both of said low frequency outputs, said automatic volume control circuit including a first amplifier, a filter tuned to one of said outputs and excited by signals from said first amplifier, a second amplifier receiving signals from said filter, means including a first rectifier circuit to convert the signals from said second amplifier to D.C. control signals, and means responsive to said D.C. control signals for varying the gain of said first amplifier in response to variations in said one output.

6. Mobile receiving apparatus for use in a hyperbolic continuous wave system of the type employing the radiation of pairs of position indicating waves together with low frequency reference signals which are derived from heterodyning said pairs of waves and are modulated upon one or more space radiated waves, said apparatus comprising means for reproducing said reference signals and for heterodyning said pairs of waves to obtain at least two low frequency beat signals; an automatic volume control circuit for each of said reference signals; a pair of series connected automatic volume control circuits for each of said beat signals; at least one of the last named automatic volume control circuits of each pair including a filtered loop tuned to the desired beat signal for developing a control signal which varies as a function of the amplitude of said desired beat signal and also including means for varying its gain in accordance with said control signal, and means responsive to the signals passed by said automatic volume control circuits for providing at least two indications representative of the position of the mobile receiving apparatus.

7. Mobile receiving apparatus for use in a hyperbolic continuous wave system of the type employing the radiation of pairs of position indicating waves together with low frequency reference signals which are derived from heterodyning said pairs of waves and are modulated upon one or more space radiated waves, said apparatus comprising means for reproducing said reference signals and for heterodyning said pairs of waves to obtain at least two low frequency beat signals, an automatic volume control circuit for each of said beat signals, each of said automatic volume control circuits including a filtered loop tuned to one of said beat signals for developing a control signal which varies as a function of the amplitude of that beat signal and also including means for varying its gain in accordance with said control signal, and means responsive to the reference signals and to the beat signals from said automatic volume control circuits for providing at least two indications representative of the position of the mobile receiving apparatus.

8. Mobile receiving apparatus for use in a hyperbolic continuous wave system of the type employing the radiation of pairs of position indicating waves together with reference signals which are derived from heterodyning said pairs of waves and are modulated upon one or more space radiated waves, said apparatus comprising means for reproducing said reference signals and for heterodyning said pairs of waves to obtain first and second beat signals, first and second automatic volume control circuits respectively responsive to said first and second beat signals, said first automatic volume control circuit including a filtered loop tuned to the first beat signal for varying its gain solely as a function of variations in the amplitude of said first beat signals, said second automatic volume control circuit including a filtered loop tuned to the second beat signal for varying its gain solely as a function of variations in the amplitude of the second beat signal, and means responsive to the reference signals and to the beat signals for providing at least two indications representative of the position of the mobile receiving apparatus.

9. Mobile receiving apparatus for use in a hyperbolic continuous wave system of the type employing the radiation of pairs of position indicating waves together with reference signals which are derived from heterodyning said pairs of waves and are modulated upon one or more space radiated waves, said apparatus comprising means for reproducing said reference signals and for heterodyning said pairs of waves to obtain first and second beat signals, a first automatic volume control circuit for the first of said beat signals including a filtered loop tuned to the first beat signal for developing a control signal which varies as a function of the amplitude of said first beat signal, said first automatic volume control circuit also including means for varying its gain in accordance with said control signal and a second automatic volume control circuit for the second of said beat frequency signals including a filtered loop tuned to the second beat signal for developing a control signal which varies as a function of the amplitude of said second beat signal, said second automatic volume control circuit also including means for varying its gain in response to variations in said control signal, and means responsive to the outputs of said first and second automatic volume control circuits and to said reference signals for providing at least two indications representative of the position of the mobile receiving apparatus.

10. Mobile receiving apparatus for use in a hyperbolic continuous wave system of the type employing the radiation of pairs of position indicating waves together with reference signals which are derived from heterodyning said pairs of waves and are modulated upon one or more space radiated wires, said apparatus comprising means for reproducing said reference signals and for heterodyning said pairs of waves to obtain first and second beat signals, an automatic volume control circuit for each of said reference signals, a first pair of series connected automatic volume control circuits for said first beat signal, at least one of the automatic volume control circuits of the first pair including a filtered loop tuned to the first beat signal for varying its gain in response to amplitude variations in said first signal, a second pair of series connected automatic volume control circuits for said second beat signal, at least one of the automatic volume control circuits of the second pair including a filtered loop tuned to the second beat signal for controlling its gain in response to amplitude variations in the second signal, and means responsive to the outputs of the automatic volume control circuits for providing at least two indications representative of the position of the mobile receiving apparatus.

11. Mobile receiving apparatus for use in a hyperbolic continuous wave system of the type employing the radiation of pairs of position indicating waves together with reference signals which are derived from heterodyning said pairs of waves and are modulated upon one or more space radiated waves, said apparatus comprising means for reproducing said reference signals and for heterodyning said pairs of waves to obtain first and second beat signals, an automatic volume control circuit for each of said reference signals, a first pair of series connected automatic volume control circuits for said first beat signal, at least one of the automatic volume control circuits of the first pair including a filtered loop tuned to the first beat signal for developing a unidirectional control signal which varies as a function of the amplitude of first beat signal and also including means for varying its gain in accordance with variations in said control signal, a second pair of series connected automatic volume control circuits for said second beat signal, at least one of the automatic volume control circuits of the second pair including a filtered loop tuned to the second beat signal for developing a unidirectional control signal which varies as a function of the amplitude of the second beat signal and also including means for varying its gain in response to amplitude variations in the last mentioned control signal, and means responsive to the outputs of the automatic volume control circuits for providing at least two indications representative of the position of the mobile receiving apparatus.

12. Mobile receiving apparatus for use in a hyperbolic continuous wave system of the type employing the radiation of pairs of position indicating waves together with reference signals which are derived from heterodyning said pairs of waves and are modulated upon one or more space radiated waves, said apparatus comprising means for reproducing said reference signals and for heterodyning said pairs of waves to obtain at least two beat signals, a first AVC circuit including a filtered loop circuit which is tuned to a first of said reference signals and which controls the gain of said first AVC circuit in order to control the amplitude of the first reference signal, a second AVC circuit including a filtered loop circuit which is tuned to a second of said reference signals and which controls the gain of said second AVC circuit in order to control the amplitude of said second reference signal, third and fourth AVC circuits, connected in series and each including a filtered loop circuit which is tuned to the first beat signal and which controls the gain of its associated AVC circuit in order to control the amplitude of said first beat signal, fifth and sixth AVC circuits connected in series and each including a filtered loop circuit which is tuned to the second beat signal and which controls the gain of its associated AVC circuit in order to control the amplitude of the second beat signal, means jointly responsive to the first beat signal and to the first reference signal after they have passed through their associated AVC circuits for producing a first indication representative of the position of the mobile receiving apparatus, and means jointly responsive to the second reference signal and to the second beat signal after they have been passed through their associated AVC circuits for producing a second indication representative of the position of the mobile receiving apparatus.

13. Mobile receiving apparatus for use in a hyperbolic continuous wave system of the type employing the radiation of pairs of position indicating waves together with first and second reference signals which are derived from heterodyning said pairs of waves and are modulated upon one or more space radiated waves, said apparatus comprising means for reproducing said reference signals and for heterodyning said pairs of waves to obtain at least two low frequency beat signals; a first AVC circuit comprising a filtered loop circuit which is tuned to said first reference signal which includes means for developing a first control signal varying in accordance with amplitude changes of the first reference signal and which further includes means responsive to said first control signal to control the gain of said first AVC circuit in order to control the amplitude of the first reference signal; a second AVC circuit including a filtered loop circuit which is tuned to a said second reference signal, which includes means for developing a second control signal varying in accordance with amplitude changes of the second reference signal, and which further includes means responsive to the second control signal to control the gain of said second AVC circuit in order to control the amplitude of said second reference signal, third and fourth AVC circuits, connected in series and each including a filtered loop circuit which is tuned to the first beat signal, which includes means for developing a control signal varying in amplitude in accordance with amplitude variations in said first beat signal, and which further includes means responsive to the last named control signal to control the gain of its associated AVC circuit in order to control the amplitude of said first beat signal; fifth and sixth AVC circuits connected in series and each including a filtered loop circuit which is tuned to the second beat signal, which includes means for developing a control signal varying in accordance with amplitude changes of said second beat signal, and which further includes means responsive to the last named control signal to control the gain of its associated AVC circuit in order to control the amplitude of the second beat signal; means jointly responsive to the first beat signal and to the first reference signal after they have passed through their associated AVC circuits for producing a first indication representative of the position of the mobile receiving apparatus; and means jointly responsive to the second reference signal and to the second beat signal after they have passed through their associated AVC circuits for producing a second indication representative of the position of the mobile receiving apparatus.

14. The apparatus defined by claim 13 wherein each of the control signals developed by each of said filtered loop circuits is a unidirectional signal varying in amplitude as a function of amplitude changes in the signal to which the filtered loop circuit is tuned.

15. In a radio position finding system of the type employing the radiation of first and second pairs of position indicating signals from at least three spaced apart points to a mobile receiving apparatus, means for alternately radiating said pairs of signals so that only one pair is radiated at a time; means for heterodyning the first pair of signals to provide a first beat signal and for developing from said first beat signal a first reference signal for transmission as a modulation component to said mobile receiving apparatus; means for heterodyning the second pair of signals to obtain a second beat signal and for developing from said second beat signal a second reference signal for transmission as a modulation component to said mobile receiving apparatus; said mobile receiving apparatus comprising means for reproducing said first and second reference signals, for heterodyning said first pair of signals to obtain a third beat signal and for heterodyning said second pair of signals to obtain a fourth beat signal; a first AVC circuit including a filtered loop tuned to the third beat signal for controlling the amplitude of said third beat signal; a second AVC circuit including a filtered loop tuned to the fourth beat signal for controlling the amplitude of the said fourth beat signal; means jointly responsive to the output of the first AVC vircuit and to the first reference signal for producing a first indication representative of the position of the mobile receiving apparatus; and means jointly responsive to the second reference signal and to the output of the second AVC circuit for producing a second indication representative of the position of the mobile receiving apparatus.

16. In a radio position finding system of the type employing the radiation of first and second pairs of position indicating signals from at least three spaced apart points to a mobile receiving apparatus, means for alternately radiating said pairs of signals so that only one pair is radiated at a time; means for heterodyning the first pair of signals to provide a first beat signal and for developing from said first beat signal a first reference signal for transmission as a modulation component to said mobile receiving apparatus; means for heterodyning the second pair of signals to obtain a second beat signal and for developing from said second beat signal a second reference signal for transmission as a modulation component to said mobile receiving apparatus; said mobile receiving apparatus comprising means for reproducing said first and second reference signals, for heterodyning said first pair of signals to obtain a third beat signal, and for heterodyning said second pair of signals to obtain a fourth beat signal; a first AVC circuit including a filtered loop circuit tuned to the third beat signal for developing a D.C. control signal having an amplitude varying as a function of changes in the amplitude of the third beat signal and also including means responsive to the control signal to vary the gain of the first AVC circuit in response to changes in amplitude of said third beat signal; a second AVC circuit including a filtered loop tuned to the fourth beat signal for developing a D.C. control signal having an amplitude which varies as a function of the amplitude of the fourth beat signal and also including means responsive to the last named control signal for controlling the gain of the second AVC circuit in order to control the amplitude of the said fourth beat signal, means jointly responsive to the output of the first AVC circuit and to the first reference signal for producing a first indication representative of the position of the mobile receiving apparatus, and means jointly responsive to the second reference signal and to the output of the second AVC circuit for producing a second indication representative of the position of the mobile receiving apparatus.

17. In a radio position finding system of the type employing the radiation of first and second pairs of position indicating signals from at least three spaced apart points to a mobile receiving apparatus, means for alternately radiating said pairs of signals so that only one pair is radiated at a time; means for heterodyning the first pair of signals to provide a first beat signal and for developing from said first beat signal a first reference signal for transmission as a modulation component to said mobile receiving apparatus, the last named means including a first AVC circuit to control the amplitude of the first beat signal; means for heterodyning the second pair of signals to obtain a second beat signal and for developing from said second beat signal a second reference signal for transmission as a modulation component to said mobile receiving apparatus, the last named means including a second AVC circuit to control the amplitude of said second beat signal; said mobile receiving apparatus comprising means for reproducing said first and second reference signals, for heterodyning said first pair of signals to obtain a third beat signal, and for heterodyning said second pair of signals to obtain a fourth beat signal; a third AVC circuit for controlling the amplitude of the first reference signal reproduced by the mobile receiving apparatus; a fourth AVC circuit for controlling the amplitude of the second reference signal reproduced by the mobile receiving apparatus; fifth and sixth AVC circuits connected in series at least one of which includes a filtered loop tuned to the third beat signal for controlling the gain of its associated AVC circuit in order to control the amplitude of said third beat signal; seventh and eighth AVC circuit connected in series at least one of which includes a filtered loop tuned to the fourth beat signal for controlling the gain of its associated AVC circuit in order to control the amplitude of said fourth beat signal; means jointly responsive to the third beat signal and to the first reference signal after they have passed through their associated AVC circuits for producing a first indication representative of the position of the mobile receiving apparatus, and means jointly responsive to the second reference signal and to the fourth beat signal after they have passed through their associated AVC circuits for producing a second indication representative of the position of the mobile receiving apparatus.

18. In a radio position finding system of the type employing the radiation of first and second pairs of position indicating signals from at least three spaced apart points to a mobile receiving apparatus, means for alternately radiating said pairs of signals so that only one pair is radiated at a time; means for heterodyning the first pair of signals to provide a first beat signal and for developing from said first beat signal a first reference signal for transmission as a modulation component to said mobile receiving apparatus, the last named means including a first AVC circuit having therein a feedback loop with a filter tuned to said first beat signal, said loop developing a control signal for altering the gain of the first AVC circuit in order to control the amplitude of the first beat signal; means for heterodyning the second pair of signals to obtain a second beat signal and for developing from said second beat signal a second reference signal for transmission as a modulation component to said mobile receiving apparatus, the last named means including a second AVC circuit having therein a feedback loop with a filter tuned to said second beat signal, the last mentioned loop being effective to develop a control signal for varying the gain of the second AVC circuit in order to control the amplitude of said second beat signal; said mobile receiving apparatus comprising means for reproducing said first and second reference signals, for heterodyning said first pair of signals to obtain a third beat signal and for heterodyning said second pair of signals to obtain a fourth beat signal; a third AVC circuit including a filtered loop circuit which is tuned to the first reference signal and which controls the gain of said third AVC circuit in order to control the amplitude of the first reference signal reproduced by the receiving apparatus; a fourth AVC circuit including a filtered loop circuit which is tuned to the second reference signal and which controls the gain of said fourth AVC circuit in order to control the amplitude of said second reference signal; fifth and sixth AVC circuits connected in series and each including a filtered loop circuit which is tuned to the third beat signal and which controls the gain of its associated AVC circuit in order to control the amplitude of said third beat signal; seventh and eighth AVC circuits connected in series and each including a filtered loop circuit which is tuned to the fourth beat signal and which controls the gain of its associated AVC circuit in order to control the amplitude of the said fourth beat signal; means jointly responsive to the third beat signal and to the first reference signal after they have passed through their associated AVC circuits for producing a first indication representative of the position of the mobile receiving apparatus, and means jointly responsive to the second reference signal and to the fourth beat signal after they have passed through their associated AVC circuits for producing a second indication representative of the position of the mobile receiving apparatus.

References Cited in the file of this patent

UNITED STATES PATENTS

| | | |
|---|---|---|
| 2,477,028 | Wilkie | July 26, 1949 |
| 2,483,557 | O'Brien | Oct. 4, 1949 |
| 2,651,033 | Frantz | Sept. 1, 1953 |
| 2,728,908 | Frantz | Dec. 27, 1955 |